United States Patent [19]

Glew et al.

[11] Patent Number: 5,796,637

[45] Date of Patent: Aug. 18, 1998

[54] APPARATUS AND METHOD FOR FILTERING EVENT SIGNALS

[75] Inventors: Andrew F. Glew, Madison, Wis.; Sumeet Agrawal, Aloha; Kamla P. Huck, Portland, both of Oreg.; Patrick G. Franklin, Kent, Wash.

[73] Assignee: Intel Corporation, Santa Clara, Calif.

[21] Appl. No.: 708,929

[22] Filed: Sep. 6, 1996

[51] Int. Cl.$^6$ .................................................. G06F 17/00
[52] U.S. Cl. ............. 364/572; 364/724.08; 364/724.011; 364/724.13; 364/724.19; 364/825
[58] Field of Search ................................ 364/572, 724.13, 364/724.011, 724.08, 724.09, 724.19, 825

[56] References Cited

U.S. PATENT DOCUMENTS

| 4,101,964 | 7/1978 | Betts ................................ 364/724.13 |
| 4,389,538 | 6/1983 | White ................................ 364/724.13 |
| 4,881,191 | 11/1989 | Morton ................................ 364/724.13 |
| 4,931,972 | 6/1990 | Obata et al. ................................ 304/724.13 |
| 5,184,350 | 2/1993 | Dara ................................ 370/105.3 |

OTHER PUBLICATIONS

Petium ® Processor Family Developer's Manual, vol. 3: Architecture and Programming Manual, Intel Corp.) 1995, Chapter 26 (pp. 26–1 through 26–11).

*Primary Examiner*—James P. Trammell
*Assistant Examiner*—Hien Vo
*Attorney, Agent, or Firm*—Blakely, Sokoloff, Taylor & Zafman

[57] ABSTRACT

A system for filtering multiple event signals from multiple event-generating sources. A selection circuit receives the multiple event signals and selects one of the event signals. A filter circuit is coupled to the selection circuit and receives the selected event signal from the selection circuit. The filter circuit produces a filtered event signal. A counter receives the filtered event signal from the filter circuit and is incremented in response to the filtered event signal. The filter circuit includes a comparison logic circuit and an edge detection logic circuit.

21 Claims, 6 Drawing Sheets

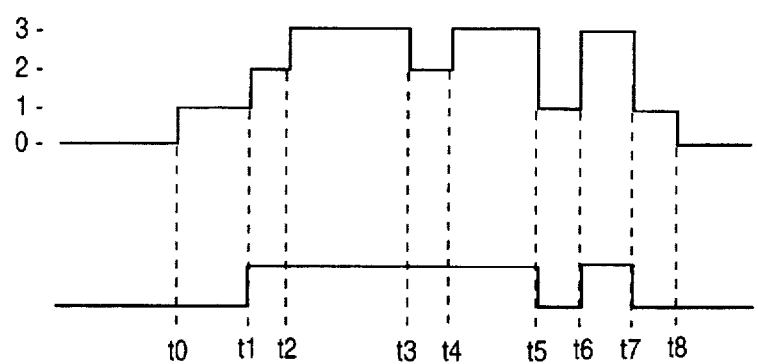
FIG. 5A
FIG. 5B
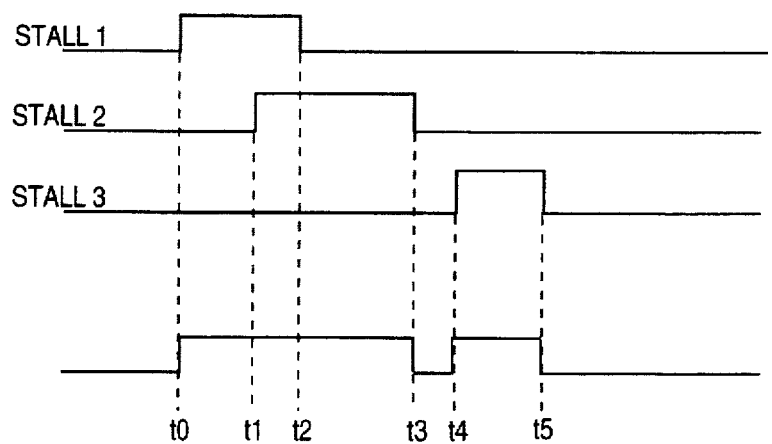
FIG. 6A
FIG. 6B

APPARATUS AND METHOD FOR FILTERING EVENT SIGNALS

BACKGROUND OF THE INVENTION

1. Field of the Invention

The present invention relates to a mechanism for filtering event signals in a processing system. More specifically, the invention provides a single filter circuit capable of filtering event signals from multiple event-generating sources.

2. Background

Various event signals are generated during the operation of a processing system. These event signals may represent various types of information indicating the performance of the processing system. For example, event signals may be generated when an instruction is decoded, executed, or retired. Additional event signals include buffer overflows, stalls (e.g., register stalls), and the number of outstanding bus requests. Other events may also be generated indicating conditions and/or performance in various portions of the processing system.

The event signals generated during operation of the processing system are used to monitor system performance, system utilization, and other system information. Various performance monitors and performance analysts use the information contained in the event signals to identify problems and improve overall system performance.

FIG. 1 illustrates a known event filtering mechanism for filtering multiple event signals produced by multiple event-generating sources. A separate filter logic circuit 10 is provided for each event signal and each event type to be filtered. Filter circuits 10 are coupled to the inputs of a multiplexer 12 having a select line (SEL) 16 for selecting one of the multiple event signals. The output of multiplexer 12 is coupled to a counter 14 which is incremented in response to the event signal selected by multiplexer 12. As shown in FIG. 1, the amount of filter logic increases as additional event signals and event types are filtered. Thus, the overall complexity of the filtering mechanism of FIG. 1 increases with the number of event signals and event types being filtered.

Various types of events may be counted during operation of the processing system. Examples of event types include duration events and occurrence events. Duration events increment the counter each clock cycle in which the event occurs or continues to occur. For example, a duration event may be counted for each clock cycle in which one or more instructions are decoded. Each cycle in which one or more instructions are retired will result in the incrementing of the counter. Occurrence events increment the counter once for each occurrence of the event. For example, if the occurrence event lasts for 20 clock cycles, the counter is only incremented once.

SUMMARY OF THE INVENTION

The present invention provides a shared filter logic circuit capable of filtering event signals from various event-generating sources. Rather than providing a separate filter circuit for each event signal, the present invention provides a single filter circuit for filtering multiple event signals. As compared with the known circuit illustrated in FIG. 1, the amount of filtering circuitry is reduced because a single circuit filters numerous event signals. Thus, a greater number of events can be filtered than might otherwise be permitted due to hardware limitations of the system.

Additionally, the present invention provides a new type of filtering provided by comparison logic and edge detection logic within the filter circuit. Thus, the invention provides for comparison event counting, edge detection event counting, and various other event types (e.g., duration events and occurrence events).

An embodiment of the invention provides a selection circuit capable of receiving multiple event signals and selecting one of the event signals. A filter circuit is coupled to the selection circuit and receives the selected event signal from the selection circuit. The filter circuit filters the selected event signal and provides a filtered event signal to a counter. The counter is incremented in response to the filtered event signal.

Another feature of the invention provides a comparison circuit within the filter circuit for comparing the selected event signal with a counter mask. An inversion circuit may be provided to invert the output of the comparison circuit.

Other aspects of the invention provide an edge detection circuit within the filter circuit. The edge detection circuit is capable of identifying rising edges and falling edges of the selected event signal.

Another feature of the invention involves a method for filtering event signals in a processing system. Multiple event signals are received from multiple event-generating sources. A particular event signal is selected from the multiple event signals. The particular event signal is filtered, thereby generating a filtered event signal. A counter is then incremented in response to the filtered event signal.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

FIGS. 5A and 5B are timing diagrams illustrating operation of an embodiment of a comparison logic circuit.

FIGS. 6A and 6B are timing diagrams illustrating operation of an embodiment of an edge detect logic circuit.

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, and circuits have not been described in detail so as not to obscure the invention.

The present invention is related to a system for filtering event signals in a processing system. A single filter logic circuit is provided for filtering multiple event signals. In one embodiment of the invention, the filter circuit utilizes a comparison logic circuit. In another embodiment of the invention, the filter circuit utilizes an edge detection logic circuit. In a further embodiment, the filter circuit uses both a comparison logic circuit and an edge detection logic circuit.

Figure 2:
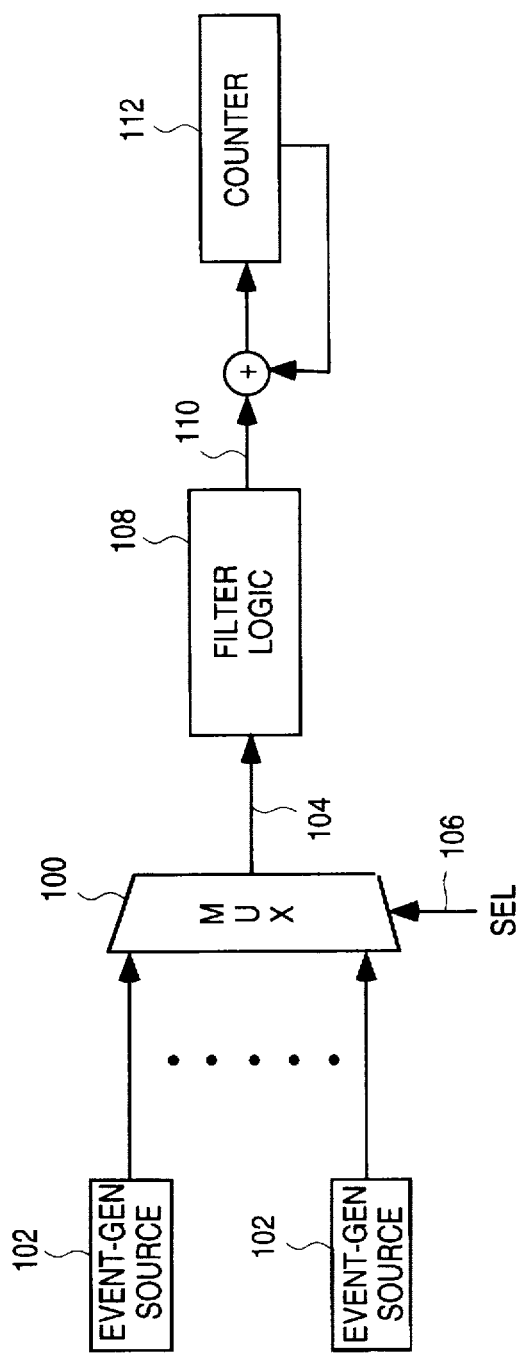
FIG. 2 is a block diagram of an embodiment of an event filtering mechanism according to the present invention.

Referring to FIG. 2, a block diagram illustrates an event filtering mechanism according to the present invention. Multiple event-generating sources 102 are coupled to the inputs of a multiplexer 100. Event-generating sources 102 may include circuits, registers, routines, or any other components or algorithms capable of producing an event signal. The event-generating sources produce multiple event signals which are provided to the inputs of multiplexer 100. In a particular embodiment of the invention, multiplexer 100 is implemented using multiple tri-state drivers. A single tri-state driver is enabled, thereby providing an event signal to a filtering circuitry. Alternatively, any other type of selection circuit or device may be used to select one of the multiple event signals.

The event signals received from event-generating sources 102 may include instructions decoded, instructions executed, instructions retired, buffer overflows, stalls, outstanding bus requests, and the like. A select line 106 determines which event signal is provided on the output of multiplexer 100. Select line 106 may be controlled by a user or process requesting monitoring or analysis of processing system performance. The selected event signal is transmitted on a transmission medium 104 connected between the output of multiplexer 100 and the input of a filter logic circuit 108. Transmission medium 104 may be a bus or similar communication means, including a single wire. Furthermore, any transmission media may be used including cables, wires or traces.

Filter logic circuit 108 receives the selected event signal and determines whether the selected event should be counted. Additional details regarding an embodiment of filter logic circuit 108 are provided below with reference to FIGS. 3 and 4. Filter logic 108 generates a filtered event signal on transmission medium 110. Transmission medium 110 is coupled to counter 112 which is incremented in response to the filtered event signal. Counter 112 may be a self-incrementing counter or any other counting mechanism.

Figure 1:
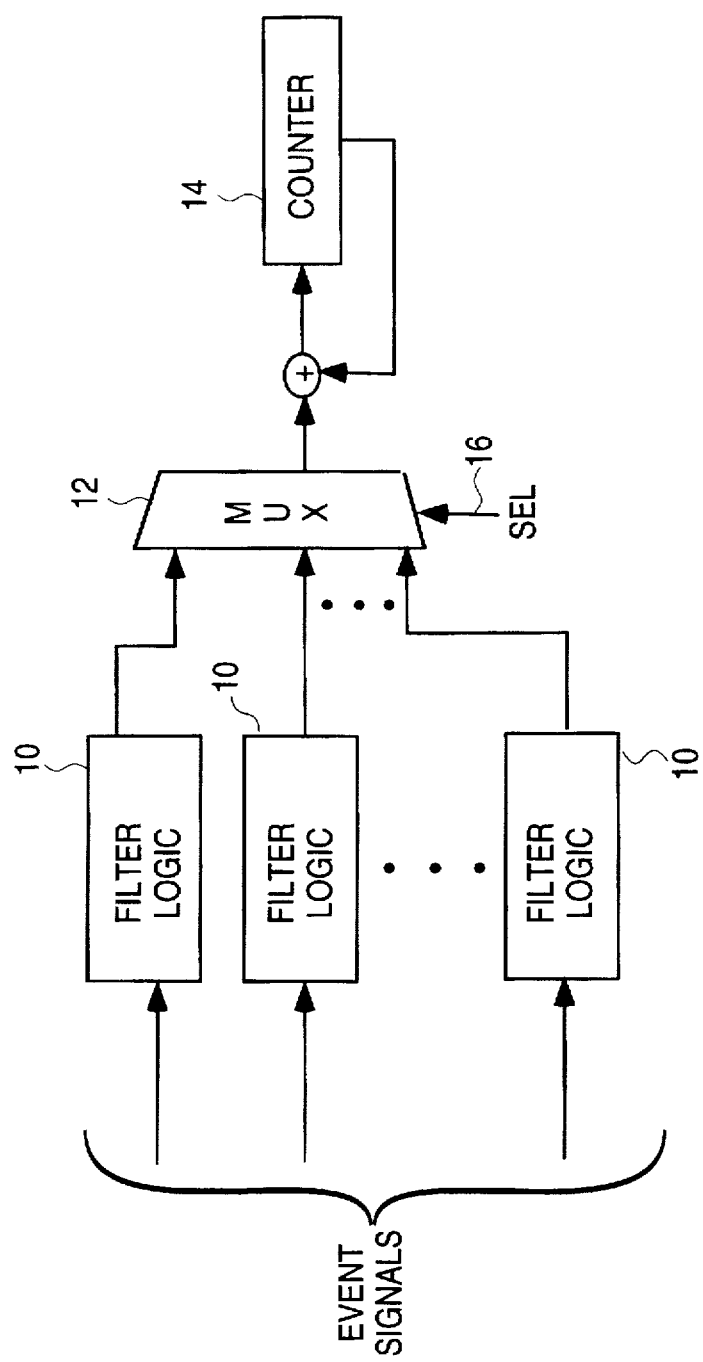
FIG. 1 illustrates a known event filtering mechanism.

As shown on FIG. 2, a single filter logic circuit 108 performs all filtering operations. Thus, a single filter logic circuit is capable of filtering a variety of event signals as selected by multiplexer 100. The configuration illustrated in FIG. 2 eliminates the need to provide a separate filter logic circuit for each event-generating source, as required by the system shown in FIG. 1. Therefore, numerous event signals may be provided to multiplexer 100 without increasing the size or complexity of the filter logic circuit.

Figure 3:
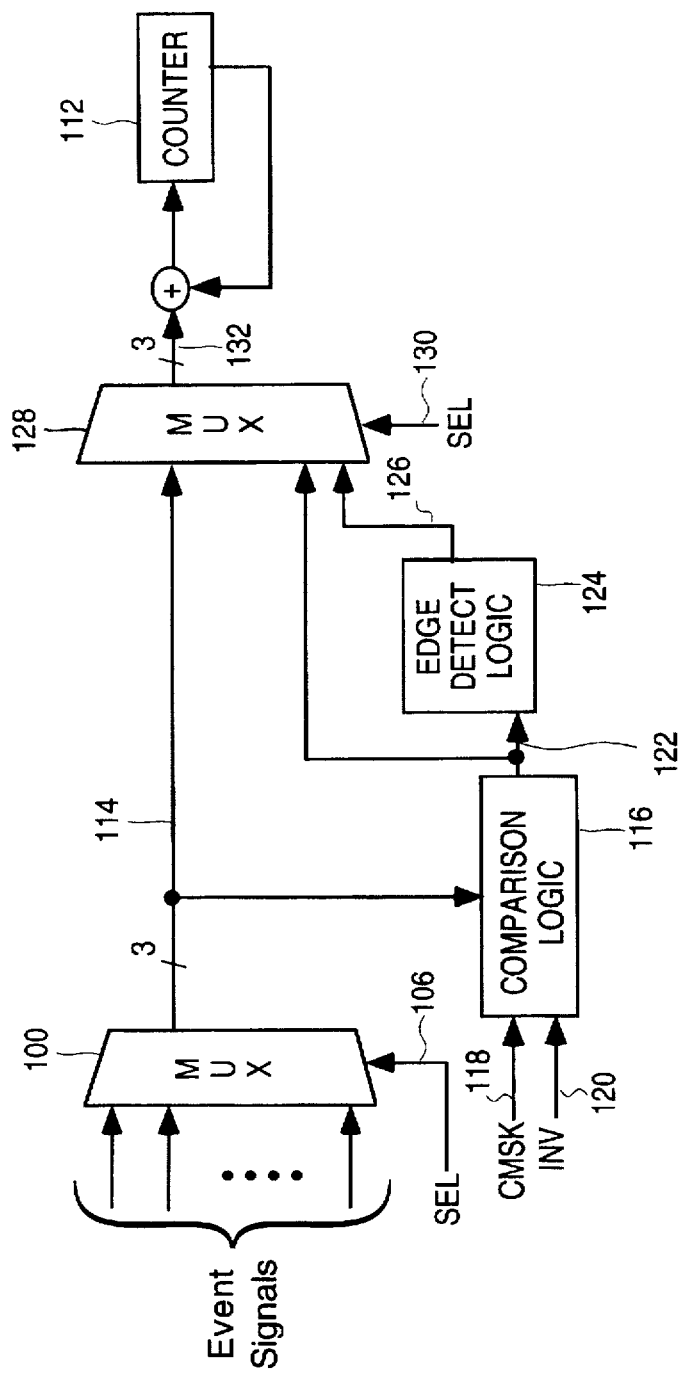
FIGS. 3 and 4 illustrate additional details of an embodiment of the filter logic shown in FIG. 2.

FIG. 3 illustrates additional details of the filter logic circuit 108 shown in FIG. 2. The selected event signal is provided on the output of multiplexer 100 to a transmission medium 114. In a particular embodiment of the invention, transmission medium 114 is a tri-state bus capable of transmitting three bits of data. Thus, the value of the data on the transmission medium may have eight possible values. Those skilled in the art will appreciate that any transmission medium may be used to transmit the selected event signal. Transmission medium 114 may include any number of wires (representing any number of bits), including a single wire, and may use any transmission protocol and any type of signal transmission media.

A comparison logic circuit 116 receives the selected event signal from transmission medium 114. Comparison logic 116 also receives a counter mask signal (CMSK) on input 118 and an inversion signal (INV) on input 120. In one embodiment of the invention, the CMSK and INV values may be stored in a register by a user or a processing routine and retrieved by the comparison logic circuit when needed.

The values of CMSK and INV are determined based on the event signal or signals to be monitored. Additional details regarding the values of CMSK and INV are provided below.

Comparison logic 116 compares the CMSK value to the event signal value on transmission medium 114 and generates an output signal on transmission medium 122. The comparison logic output signal is provided to the input of an edge detect logic circuit 124 and an input of a multiplexer 128. Edge detect logic 124 generates an output on transmission medium 126 which is provided to an input of multiplexer 128. The output generated by edge detect logic 124 indicates the presence or absence of a rising edge or falling edge in the event signal.

Multiplexer 128 receives input signals from multiplexer 100, from comparison logic 116, and from edge detect logic 124. A multiplexer select line 130 selects among the three multiplexer inputs and generates a filtered event signal output on transmission medium 132. Counter 112 is then incremented in response to the filtered event signal output. In one embodiment of the invention, the signal on select line 130 is retrieved from a register storing variables used in the event filtering process. As mentioned above, these variables may be determined and stored by a user or processing routine based on the desired event signal or signals to be monitored.

Figure 4:
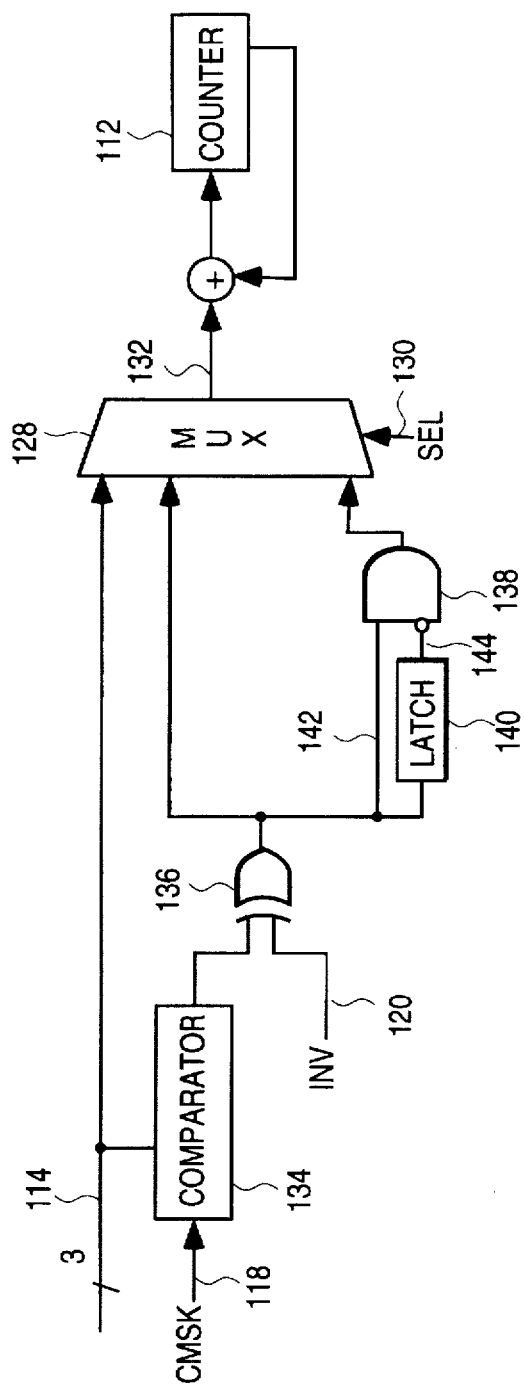

Referring to FIG. 4, additional details of comparison logic 116 and edge detect logic 124 are shown. An embodiment of comparison logic 116 (FIG. 3) includes a comparator 134 and an Exclusive-OR (XOR) gate 136 coupled as shown in FIG. 4. Comparator 134 receives the CMSK signal on input 118 and XOR gate 136 receives the INV signal on input 120. As discussed in greater detail below, the INV signal is used to invert the output of comparator 134.

An embodiment of edge detect logic 124 (FIG. 3) includes an AND gate 138 and a latch 140, coupled as shown in FIG. 4. One input of AND gate 138 receives an event signal on transmission medium 142. This signal represents the current status of the selected event signal. The second input of AND gate 138 receives the previous version of the event signal on transmission medium 144. The previous version of the event signal is available from latch 140 which operates to delay event signals received from XOR gate 136. By comparing the current status of the event signal and the previous version of the signal, AND gate 138 (in conjunction with the INV signal) is capable of detecting either a rising edge or a falling edge of the event signal. AND gate 138 and latch 140 are capable of detecting a rising edge in the event signal. By inverting the event signal using the INV signal coupled to XOR gate 136, a falling edge in the event signal is changed to a rising edge at the input to AND gate 138. AND gate 138 then receives the rising edge of the event signal at the first input of the AND gate. The second input of AND gate 138 is inverted such that a difference between the current and previous event signal generates a logic "high" signal from the AND gate to multiplexer 128. If the current event signal is identical to the previous event signal, then AND gate 138 generates a logic "low" signal.

Operation of the filtering mechanism will be described with reference to the embodiment shown in FIG. 4. Comparator 134 receives the selected event signal on transmission medium 114. As discussed above, a multiplexer or similar selection circuit is used to select among multiple event signals from the multiple event-generating sources. The comparison circuitry is particularly useful with events capable of occurring more than once per clock cycle.

The counter mask (CMSK) signal is provided to comparator 134 using input 118. Comparator 134 compares the selected event signal with CMSK and generates an output which is provided to XOR gate 136. In an embodiment of the invention, comparator 134 performs a greater-than-or-equal-to comparison of CMSK and the selected event signal. If the comparison is true, then a logic "high" output is generated by the comparator. If the comparison is false, then the comparator generates a logic "low" signal.

Inversion signal INV is provided to XOR gate 136 on input 120. The inversion signal functions to invert the signal generated by comparator 134. Thus, when INV is set low, the output of comparator 134 passes through XOR gate 136 unchanged. When INV is set high, XOR gate 136 inverts the output received from comparator 134. Thus, when INV is high, XOR gate 136 functions as an inverter by inverting the output of comparator 134. The output from XOR gate 136 is provided to both the edge detect circuitry and an input of multiplexer 128.

The edge detect circuitry provides an output signal to an input of multiplexer 128. Depending on the type of filtering desired, multiplexer 128 selects between the unfiltered signal provided on transmission medium 114 (e.g., occurrence mode filtering), the output from XOR gate 136 (e.g., comparison mode filtering), and the output from AND gate 138 (e.g., edge mode filtering). The selected signal is then provided to counter 112 which may be incremented depending on the value or status of the filtered event signal. If the filtered event signal provided to counter 112 is zero, the counter will not be incremented. However, if the filtered event signal is non-zero, then the counter will be incremented by the value of the filtered event signal.

FIGS. 5A and 5B illustrate timing diagrams for a selected event signal (FIG. 5A) and a filtered event signal output (FIG. 5B). In this example, the filtering circuit is used to count the number of clock cycles in which the value of the selected event signal is at least two. The selected event being counted may be instructions decoded, instructions executed or instructions retired. Regardless of the value of the actual event signal received, the filtering circuit will only cause the counter to increment by one during cycles in which the event signal value is two or greater; e.g., two or more instructions decoded. Multiplexer 128 selects the output from the comparison logic, as generated by XOR gate 136, as the filtered event signal provided on transmission medium 132. The CMSK value provided to comparator 134 is set to a value of two (represented in binary notation as 010), thereby comparing the selected signal on transmission medium 114 with a value of two. This results in a greater-than-or-equal-to two comparison generating a logic high signal when the event signal on transmission medium 114 has a value greater than or equal to two.

In FIG. 5A, at time $t_0$, the event signal value changes from zero to one. The comparator output remains low, because the event signal has not yet reached the CMSK value of two. At time $t_1$, the event signal changes to a value of two, thereby causing the comparator output to change to a logic high. The filtered event signal remains high until time $t_5$, when the event signal value on transmission medium 114 drops below two. At time $t_6$, the event signal increases to a value of three, causing the comparator output to change to logic high. At time $t_7$, the event signal again drops below two, causing the comparator output to change to logic low. In this example, the filtered event signal provides a significantly different signal to the counter than does the original event signal provided on transmission medium 114. The counter is incremented by one when the actual event signal is two or greater. In the above example, the comparison operation may be changed by adjusting the value of CMSK. For example, the filtering circuit may cause the counter to increment during cycles in which the event signal value is three or greater by changing the value of CMSK to three.

The comparison circuitry is capable of controlling or "filtering" the actual count value provided to counter 112. As shown above in FIGS. 5A and 5B, the event signals on transmission medium 114 have a range of values from zero to three. However, the filtered event signal output provided to counter 112 is either zero or one. Thus, the comparison circuitry may alter the actual value of the event signal on transmission medium 114 such that a different value, representing a different parameter, is used to increment counter 112.

The comparison operation performed by the filtering circuit may be reversed such that a less-than comparison is performed (instead of a greater-than-or-equal-to comparison). This is accomplished by inverting the output of comparator 134 with an active INV signal applied to XOR gate 136.

In another example, the comparison circuitry may be used to determine the "parallelism" of a superscalar processing system. The average parallelism is calculated using the following formula:

$$\text{average parallelism} = \frac{\text{Number of Instructions Retired}}{\text{Total Number of Cycles}}$$

However, average parallelism does not indicate the distribution of the retired instructions. Thus, it is also important to determine whether the retirement of instructions in a superscalar processing system is "smooth" or "bursty." Smooth retirement of instructions refers to a constant or near-constant retirement rate; e.g., one instruction retired during most cycles. In contrast, bursty retirement of instructions refers to a large variance in the retirement of instructions; e.g., retiring three instructions during 33% of the cycles and retiring zero instructions during 67% of the cycles. In both situations, the average parallelism is one, but the actual performance of the processing system is significantly different. By using the comparison logic discussed above, the filtering circuit can measure the distribution of the retired instructions. Various performance analysts use these measurements to investigate problems and improve system performance.

The edge detect circuit provided by AND gate 138 and latch 140 permits the detection of either a rising edge or a falling edge in the event signal on transmission medium 114. Since the edge detect circuit has no direct connection to transmission medium 114, the event signal is provided through comparator 134 and XOR gate 136. To detect an edge, both CMSK and INV may be set to zero, causing the event signal on transmission medium 114 to pass through the comparator and XOR gate unchanged. As discussed above, the current status of the event signal is provided to AND gate 138 on transmission medium 142. A delayed, or previous event signal, is generated by latch 140 and provided to an inverted input of the AND gate on transmission medium 144. By ANDing together the current version of the event signal and the inverse of the previous version, AND gate 138 is capable of detecting rising edges and falling edges.

The edge detect logic is particularly useful in detecting and measuring stalls; i.e., measuring the number of cycles in which the system, or a portion of the system, is stalled. The edge detect circuitry is capable of detecting a new stall (indicated by a rising edge), a continuing stall (indicated by a continuing active signal), and the end of a stall (indicated by a falling edge).

Referring to FIGS. 6A and 6B, timing diagrams illustrate a series of stalls (FIG. 6A) and the resulting output stall signal (FIG. 6B). In the example of FIG. 6A, three different stall signals are shown (Stall 1, Stall 2, and Stall 3). The values of the three stall signals are OR'ed together to produce a single output (FIG. B) indicating whether any of the stall signals are active during a particular time period. The single output signal is provided to the filtering logic illustrated in FIG. 4. Since a single filtering circuit is used, only one stall signal may be provided to the filtering circuit. Due to the single stall signal, the filtering circuit is not capable of distinguishing between two or more "back-to-back" or overlapping stall signals.

As shown in FIG. 6A, Stall 1 and Stall 2 overlap one another between times $t_1$ and $t_2$. Therefore, the output stall signal shown in FIG. 6B remains active from the beginning of Stall 1 ($t_0$) and the end of Stall 2 ($t_3$). Similarly, the output stall signal is active between times $t_4$ and $t_5$. Thus, the output signal of FIG. 6B accurately indicates the clock cycles in which at least one of the stall signals is active, but does not identify two separate stall signals during time periods $t_0$ and $t_3$. This configuration represents a tradeoff between the amount of information provided by the filtering circuitry and the complexity of the filtering circuitry. By simplifying the filter logic to provide a single filtering circuit, the circuit is unable to distinguish between back-to-back or overlapping stall signals.

The edge detect circuitry is capable of measuring the length of stall cycles and when the stall cycles occur. These measurements permit the calculation of the average duration of a stall. Furthermore, by using the INV signal in the comparison circuitry, the stall event may occur at the beginning (rising edge) or at the end (falling edge) of the stall duration. This permits the stall to be closely associated with the event or activity causing the stall.

Depending on the information desired, the filtering circuit may cause the counter to increment during each cycle in which the stall is occurring, increment when the stall occurs (rising edge), or increment when the stall ends (falling edge). These various incrementing methods permit both aggregate counting of stalled cycles and statistical samplings of the status of the processing system.

The comparison logic circuit and the edge detect logic circuit may be used in combination to count various events. For example, the combined circuits may cause the counter to increment in response to a falling edge where less than three instructions are retired in a particular cycle. Multiplexer 128 (FIG. 4) selects the output from AND gate 138 as the filtered event signal provided to counter 112. In this example, CMSK has a value of three, indicating a comparison to determine whether the number of cycles retired is greater-than-or-equal-to three. A falling edge indicates a condition in which the system previously retired at least three instructions, but failed to retire three instructions in the current cycle. If the system is typically capable of retiring three instructions in each cycle, a problem may be indicated if fewer than three instructions are retired. This alerts the processing system to a possible performance problem.

Figure 7:
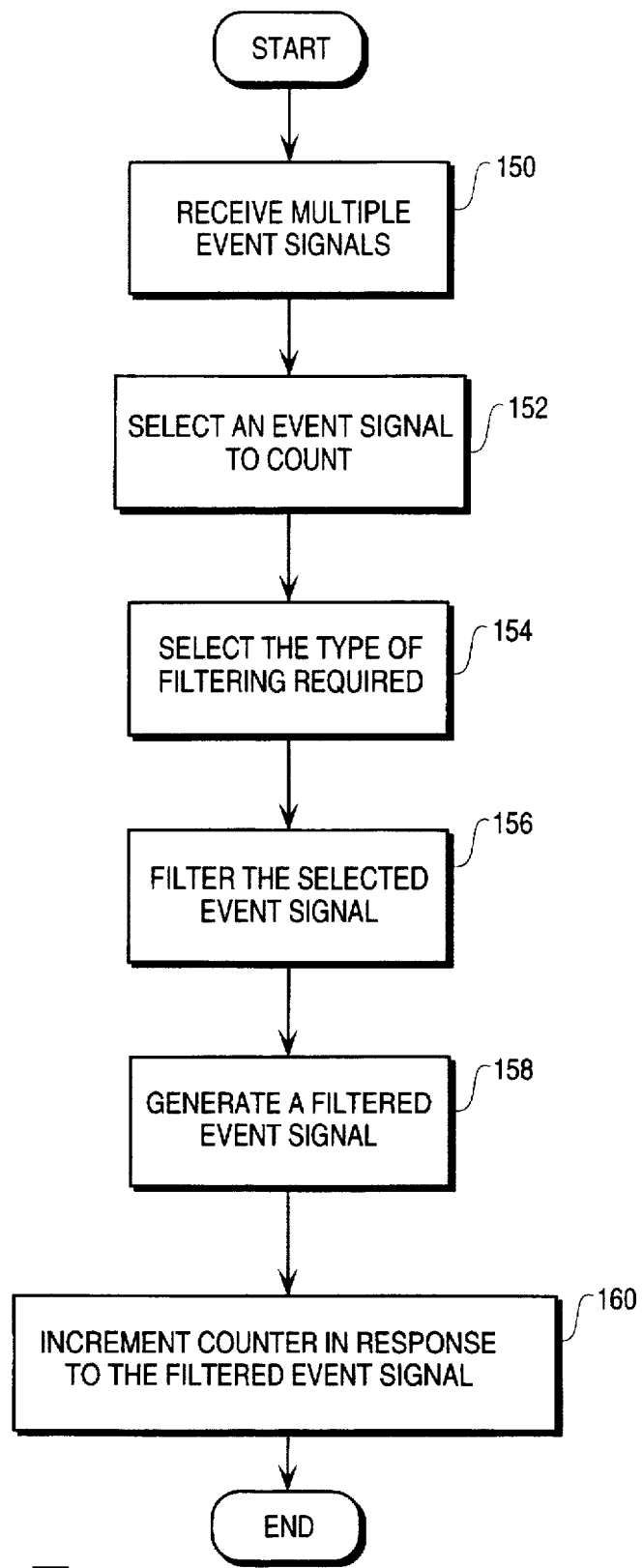
FIG. 7 is a flow diagram illustrating the operation of an embodiment of the invention.

Referring to FIG. 7, a flow diagram illustrates the operation of the invention. At step 150, multiple event signals are received from multiple event-generating sources. At step 152, an event signal is selected from the multiple event signals. As discussed above, a multiplexer or similar circuit may be used to select a particular event signal. At step 154, the type of filtering desired is selected. The selected event signal is filtered at step 156 by providing the event signal directly to the counter, performing comparison operations on the selected event signal, or performing an edge detect operation on the selected event signal. At step 158, a filtered event signal is generated, and the counter is incremented at step 160 in response to the filtered event signal.

From the above description and drawings, it will be understood by those skilled in the art that the particular embodiments shown and described are for purposes of illustration only and are not intended to limit the scope of the invention. Those skilled in the art will recognize that the invention may be embodied in other specific forms without departing from its spirit or essential characteristics. References to details of particular embodiments are not intended to limit the scope of the claims.

What is claimed is:

1. An apparatus for filtering event signals in a processing system comprising:

a selection circuit coupled to receive a plurality of event signals and select one of said event signals;

a filter circuit coupled to said selection circuit and receiving said selected event signal, said filter circuit generating a filtered event signal; and a counter coupled to said filter circuit, said counter incremented in response to said filtered event signal.

2. The apparatus of claim 1 further including a multiplexer coupled to said filter circuit and said selection circuit, wherein said multiplexer selects between signals from said selection circuit and said filter circuit.

3. The apparatus of claim 1 wherein said selection circuit includes a multiplexer coupled to receive said plurality of event signals.

4. The apparatus of claim 1 wherein said selection circuit includes a plurality of tri-state drivers coupled to receive said plurality of event signals.

5. The apparatus of claim 1 wherein said filter circuit includes a comparison circuit for comparing said selected event signal with a counter mask.

6. The apparatus of claim 5 wherein said comparison circuit includes an inversion circuit capable of inverting a comparison circuit output in response to an inversion signal.

7. The apparatus of claim 1 wherein said filter circuit includes an edge detection circuit.

8. The apparatus of claim 7 wherein said edge detection circuit includes a latch coupled to an input of an AND gate.

9. The apparatus of claim 1 wherein said filter circuit includes a comparison circuit coupled to an edge detection circuit.

10. The apparatus of claim 9 further including a multiplexer coupled to said comparison circuit, said edge detection circuit, and said selection circuit, wherein said multiplexer selects between signals from said selection circuit and said filter circuit.

11. An apparatus for filtering event signals comprising:

a selection circuit having a plurality of inputs coupled to a plurality of event-generating sources;

a filter circuit coupled to an output of said selection circuit, said filter circuit adapted to generate a filtered event signal; and a counter coupled to said filter circuit, said counter incremented in response to said filtered event signal.

12. The apparatus of claim 11 wherein said filter circuit includes a comparison circuit for comparing said selected event signal with a counter mask.

13. The apparatus of claim 11 wherein said filter circuit includes an edge detection circuit.

14. The apparatus of claim 11 wherein said filter circuit includes a comparison circuit coupled to an edge detection circuit.

15. An apparatus for filtering event signals in a processing system comprising:

means for receiving a plurality of event signals from a plurality of event-generating sources;

means for selecting a particular event signal from said plurality of event signals;

means for filtering said selected event signal; and means for incrementing a counter coupled to said means for filtering said selected event signal.

16. The apparatus of claim 15 wherein said means for filtering said selected event signal includes a comparison circuit for comparing said selected event signal with a counter mask.

17. The apparatus of claim 15 wherein said means for filtering said selected event signal includes an edge detection circuit.

18. The apparatus of claim 15 wherein said means for filtering said selected event signal includes a comparison circuit coupled to an edge detection circuit.

19. A method for filtering event signals in a processing system, said method comprising the steps of:

receiving a plurality of event signals from a plurality of event-generating sources;

selecting a particular event signal from said plurality of event signals;

filtering said selected event signal;

generating a filtered event signal; and incrementing a counter in response to said filtered event signal.

20. The method of claim 19 wherein the step of filtering said selected event signal includes comparing said selected event signal to a counter mask.

21. The method of claim 19 wherein the step of filtering said selected event signal includes detecting an edge of said selected event signal.

* * * * *